United States Patent
Berglund et al.

(10) Patent No.: US 11,370,026 B2
(45) Date of Patent: Jun. 28, 2022

(54) METHOD FOR MANUFACTURE A METALLIC COMPONENT BY PRE-MANUFACTURED BODIES

(71) Applicant: MTC Powder Solutions AB, Surahammar (SE)

(72) Inventors: Tomas Berglund, Falun (SE); Rickard Sandberg, Sandviken (SE); Martin Ostlund, Gavle (SE); Johan Sundstrom, Stockholm (SE)

(73) Assignee: MTC Powder Solutions AB, Surahammar (SE)

( * ) Notice: Subject to any disclaimer, the term of this patent is extended or adjusted under 35 U.S.C. 154(b) by 31 days.

(21) Appl. No.: 16/885,371

(22) Filed: May 28, 2020

(65) Prior Publication Data

US 2020/0290127 A1    Sep. 17, 2020

Related U.S. Application Data

(63) Continuation of application No. 15/300,854, filed as application No. PCT/EP2015/057229 on Apr. 1, 2015, now Pat. No. 10,702,922.

(30) Foreign Application Priority Data

Apr. 2, 2014    (EP) .................................... 14163177

(51) Int. Cl.
*B22F 5/00* (2006.01)
*B22F 3/15* (2006.01)
(Continued)

(52) U.S. Cl.
CPC ............ *B22F 5/008* (2013.01); *B22F 3/1017* (2013.01); *B22F 3/11* (2013.01); *B22F 3/1208* (2013.01);
(Continued)

(58) Field of Classification Search
CPC ........ B22F 5/008; B22F 10/10; B22F 3/1208; B22F 7/062; B22F 3/1017; B22F 3/11;
(Continued)

(56) References Cited

U.S. PATENT DOCUMENTS

| | | | |
|---|---|---|---|
| 2011/0209468 A1 | 9/2011 | Hoeg | |
| 2012/0135166 A1* | 5/2012 | Berglund | .................. B22F 7/06 428/34.1 |
| 2013/0224058 A1 | 8/2013 | Berglund et al. | |

FOREIGN PATENT DOCUMENTS

| | | |
|---|---|---|
| EP | 1549449 A1 | 7/2005 |
| EP | 2452766 A1 | 5/2012 |

(Continued)

OTHER PUBLICATIONS

Hong et al, "A Review of Additive Manufacturing", ISRN Mechanical Engineering; 2012: 208760, pp. 1-10 (2012).

*Primary Examiner* — Daniel C. McCracken
(74) *Attorney, Agent, or Firm* — Morgan, Lewis & Bockius LLP

(57) ABSTRACT

A method for manufacturing a metallic component including the steps of providing a capsule, which defines at least a portion of the shape of the metallic component, arranging metallic material in the capsule, sealing the capsule, subjecting the capsule to Hot Isostatic Pressing for a predetermined time, at a predetermined pressure and at a predetermined temperature, and optionally, removing the capsule. The metallic material is at least one pre-manufactured coherent body, which pre-manufactured coherent body being made of metallic powder, wherein at least a portion of the metallic powder is consolidated such that the metallic powder is held together into a pre-manufactured coherent body. At least one portion of the pre-manufactured coherent (Continued)

body is manufactured by Additive Manufacturing by subsequently arranging superimposed layers of metallic powder.

40 Claims, 2 Drawing Sheets

(51) Int. Cl.
| | |
|---|---|
| *B22F 3/12* | (2006.01) |
| *F01L 3/00* | (2006.01) |
| *B22F 7/06* | (2006.01) |
| *F01L 3/02* | (2006.01) |
| *B22F 10/10* | (2021.01) |
| *B33Y 10/00* | (2015.01) |
| *B33Y 80/00* | (2015.01) |
| *B22F 3/10* | (2006.01) |
| *B22F 3/11* | (2006.01) |
| *B22F 3/16* | (2006.01) |
| *F16K 27/00* | (2006.01) |

(52) U.S. Cl.
CPC .................. *B22F 3/15* (2013.01); *B22F 3/16* (2013.01); *B22F 7/062* (2013.01); *B22F 10/10* (2021.01); *B33Y 10/00* (2014.12); *B33Y 80/00* (2014.12); *F01L 3/00* (2013.01); *F01L 3/02* (2013.01); *F16K 27/00* (2013.01); *B22F 2998/10* (2013.01); *F01L 2303/00* (2020.05); *Y02P 10/25* (2015.11)

(58) Field of Classification Search
CPC .......... B22F 3/16; B22F 3/15; B22F 2998/10; B22F 10/20; B22F 10/00; F01L 3/00; F01L 3/02; F01L 2303/00; B33Y 10/00; B33Y 80/00; F16K 27/00; Y02P 10/25
See application file for complete search history.

(56) References Cited

FOREIGN PATENT DOCUMENTS

| | | |
|---|---|---|
| EP | 2781284 A1 | 9/2014 |
| JP | 62-280305 A | 12/1987 |
| JP | 2011-514471 A | 5/2011 |
| JP | 2014-500909 A | 1/2014 |
| WO | 2004/030850 A1 | 4/2004 |
| WO | 2010114474 A1 | 10/2010 |
| WO | 2012/062786 A1 | 5/2012 |

* cited by examiner

METHOD FOR MANUFACTURE A METALLIC COMPONENT BY PRE-MANUFACTURED BODIES

RELATED APPLICATION DATA

This application is a continuation application of U.S. application Ser. No. 15/300,854 filed on Sep. 30, 2016, which is a § 371 National Stage Application of PCT International Application No. PCT/EP2015/057229 filed Apr. 1, 2015, claiming priority of EP Application No. 14163177.0 filed Apr. 2, 2014, the entire contents of each of these applications are incorporated herein by reference by reference.

TECHNICAL FIELD

The present disclosure relates to a method for manufacturing a metallic component.

BACKGROUND ART

Hot Isostatic Pressing (HIP) is a preferred method for manufacturing components of near net shape and in high performance materials. In HIP, a capsule is defining the shape of the component and is typically manufactured from steel sheets. The capsule is filled with metal- or composite powder and subjected to high temperature and high isostatic pressure so that the metal powder bond metallurgically to a dense component of forge like strength.

Hot Isostatic Pressing is suitable for manufacturing components having regions of different material. Typically, such components are manufactured by adding the different materials in powder form into the capsule. To achieve the desired properties of each separate material, it is thereby critical to avoid mixing of the different powders.

A common technique to position the different powders in the capsule is to use a filling template during powder filling and then remove the template prior to sealing the capsule. A drawback with this technique is that it is quite difficult to control powder separation when the template is removed. The technique is also quite limited with regards to size and geometry of the different powder regions.

Attempts have been made to facilitate manufacturing of components having regions of different material. For example, WO2010/114474 shows a method in which bodies of polymer material and metal powder are manufactured and then placed in selected regions in the HIP capsule. However, although proven successful, this method is time consuming since the polymer material in the bodies needs to be removed prior to HIP. The method may further result in carbon rich residues in the capsule.

Consequently, it is an aspect of the present disclosure to achieve a method for manufacturing metallic components which remedies or at least overcomes one or more problems of the prior art.

In particular, it is an aspect of the present disclosure to achieve a method which allows for effective production for metallic components with HIP. A further aspect of the present disclosure is to provide an improved method for manufacturing of a metallic component with regions of different materials.

DEFINITIONS

By "metallic materials" is meant materials which are metals or composites of metals and non-metallic phases or particles. Examples, but not limiting, of metals are pure metals or alloys of metals and other elements, such as steel. An example of composite material is Metal Matrix Composites which comprises hard particles, such as, but not limiting to WC, TiC, TaC, TiN or hard phases in a metal matrix, such as, but not limiting to, Ni, Co, Fe, Cr.

By "coherent body which consists of metallic powder material" or "coherent body" as used herein interchangeably is meant a body having sufficient strength to be allowed to be handled manually, i.e. by hand, without breaking.

SUMMARY OF THE DISCLOSURE

According to the present disclosure, at least one of the above mentioned aspects is met by a method for manufacturing a metallic component comprising the steps:

providing 100 a capsule 5 which defines at least a portion of the shape of the metallic component 50; arranging 200 metallic material 7 in the capsule 5; sealing 300 the capsule 5; subjecting 400 the capsule 5 to Hot Isostatic Pressing for a predetermined time, at a predetermined pressure and at a predetermined temperature; optionally, removing 500 the capsule 5; characterized in that the metallic material 7 comprises at least one pre-manufactured coherent body 1, 2, 3, 4 in which the pre-manufactured coherent body 1, 2, 3, 4 consists of metallic powder wherein at least a portion of the metallic powder is consolidated such that the metallic powder is held together into a pre-manufactured coherent body 1, 2, 3, 4 and wherein at least one portion of the pre-manufactured coherent body 1. 2, 3, 4 is manufactured by Additive Manufacturing by subsequently arranging superimposed layers of metallic powder.

The Additive Manufacturing is a technique wherein discrete layers of metallic powder are continuously placed on top of each other until the preformed body is formed. This technique allows for manufacturing of bodies of complicated geometries. According the present method as defined hereinabove or hereinafter the Additive Manufacturing may be 3D printing.

According to the present disclosure, more than one portion of the pre-manufactured coherent body 1, 2, 3, 4 are manufactured by Additive Manufacturing, such as two or three portions of the pre-manufactured coherent body 1, 2, 3, 4 are manufactured by Additive Manufacturing. According to a further embodiment of the method as defined hereinabove or hereinafter, the pre-manufactured coherent body 1, 2, 3, 4 is manufactured by Additive Manufacturing, i.e. all of said pre-manufactured coherent body 1, 2, 3, 4 is manufactured by Additive Manufacturing.

The pre-manufactured coherent body 1, 2, 3, 4 used in the method as defined hereinabove or hereinafter may be handled without the risk of breaking. This makes it possible to position the pre-manufactured coherent body with high accuracy in the HIP capsule and when several bodies of different materials, such as two or more, are arranged in the capsule, there is no risk that the different materials mix.

The entire pre-manufactured coherent body 1, 2, 3, 4 may consist of sintered metallic powder. Hence, the entire pre-manufactured coherent body 1, 2, 3, 4 may be consolidated by sintering. Sintering is an effective method for achieving sufficient strength in the pre-manufactured coherent body. Moreover, by selecting an appropriate sintering temperature, the final sintered body may be given a porosity which closely matches the porosity of loose metallic powder. Therefore, when the capsule also is filled with loose metallic powder, the sintered body will shrink and deform in a manner equal to the loose metallic powder. This, in turn will result in homogenous and predictable deformation of the final component.

According to an alternative, only a surface portion of the pre-manufactured coherent body 1, 2, 3, 4 may be consolidated. Thus, the surface portion of pre-manufactured coherent body 1, 2, 3, 4 will consist of consolidated metallic powder.

Furthermore, according to one alternative, a binder is added to the surface portion of the pre-manufactured coherent body 1, 2, 3, 4 before Additive Manufacturing by subsequently arranging superimposed layers of metallic powder and binder. The binder may be driven off by e.g. heat treatment before sintering is performed.

According to an alternative, the metallic powder in a surface portion of the pre-manufactured coherent body may be consolidated by melting followed by cooling. Further, according to the present method as defined hereinabove or hereinafter, parts of the pre-manufactured body 1, 2, 3, 4 may be consolidated by using laser beam or electron beam irradiation, such as the surf ace portion.

The method as defined hereinabove or hereinafter may be employed for manufacturing valve spindle 50, comprising a valve disc 52 and a valve stem 53, wherein the capsule 5 defines at least a portion of the valve disc 52;
the metallic material 7 consists of a valve seat 1, a core body 2 which comprises a core head 11 which defines an inner portion of the valve disc 52, a cladding layer 4 and a buffer layer 3 which is arranged on the core head 11; wherein, at least one of the valve seat 1, the buffer layer 3 and the cladding layer 4 are coherent pre-manufactured bodies of metallic powder.

According to an alternative, two of the valve seat 1, the buffer layer 3 and the cladding layer 4 may be coherent pre-manufactured bodies of metallic powder and the remaining metallic material may be loose metallic powder. Thereby is achieved that the valve spindle, which has a rather complicated design with three components of different materials may be manufactured without the risk of mixing the different materials. The pre manufactured bodies are preferably sintered, which in combination with loose powder results in homogenous and predictable deformation of the HIP:ed valve spindle.

For example, at least the valve seat 1 and the buffer layer 3 are coherent pre-manufactured bodies of metallic powder and the cladding layer 4 is loose metallic powder. Alternatively, at least the valve seat 1 and the cladding layer 4 are coherent pre-manufactured bodies of metallic powder and the buffer layer 3 is loose metallic powder. Alternatively, at least the buffer layer and 3 and the cladding layer 4 are coherent pre-manufactured bodies of metallic powder and the valve seat is loose metallic powder. Alternatively, at least the valve seat 1, the buffer layer 3 and the cladding layer 4 are coherent pre-manufactured bodies of metallic powder.

The core body 2 may also be a pre-manufactured coherent body of metallic powder. However, the core body may also be manufactured by forging of solid metallic material.

According to the present method as defined hereinabove or hereinafter, the valve seat 1 and/or the buffer layer 3 and/or the cladding layer 4 are pre-manufactured by sintering metallic powder, wherein sintering is performed at a temperature below the melting point of the metallic powder and at atmospheric pressure. In the case the core body 2 is a pre-manufactured body of metallic powder also the core body 2 is may be sintered.

A binder may also be added to, apart for the surface portion of the pre-manufactured coherent body 1, 2, 3, 4, other portion of the pre-manufactured coherent body 1, 2, 3, 4. The function of the addition of the binder to the other portions of the pre-manufactured coherent body 1, 2, 3, 4 is to provide for the manually handling of the pre-manufactured coherent body 1, 2, 3, 4, i.e. that said body may be handled by hand, without breaking.

DETAILED DESCRIPTION OF EMBODIMENTS

Figure 6:
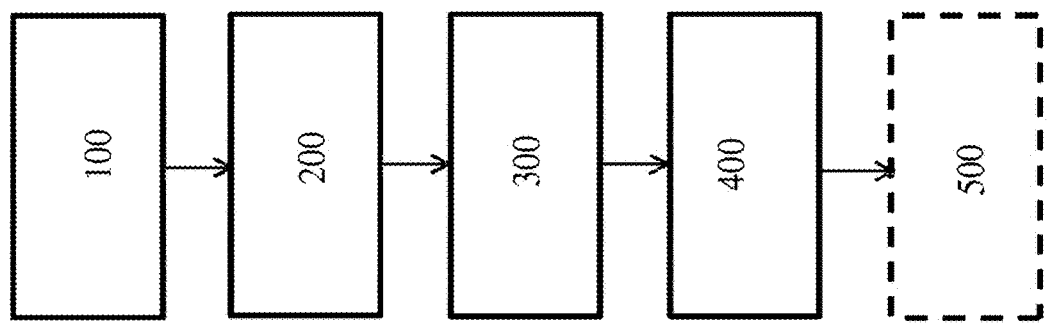
FIG. 6: A flow chart showing the order of the main steps of the present method.

The method as defined hereinabove and hereinafter will in the following be described in detail with reference to the manufacturing of a metallic component in the form of a valve spindle. The general order of the main steps of the inventive method is shown in the flow chart of FIG. 6.

The described embodiment relates to the manufacturing of a valve spindle for two-stroke marine diesel engines. However, this is not to be understood as limiting for the present disclosure, it should be appreciated that the inventive method is suitable for the manufacturing of all types of metallic components, for example impellers, fuel nozzles, rotor shafts and stress-o-meter rings.

Figure 4:
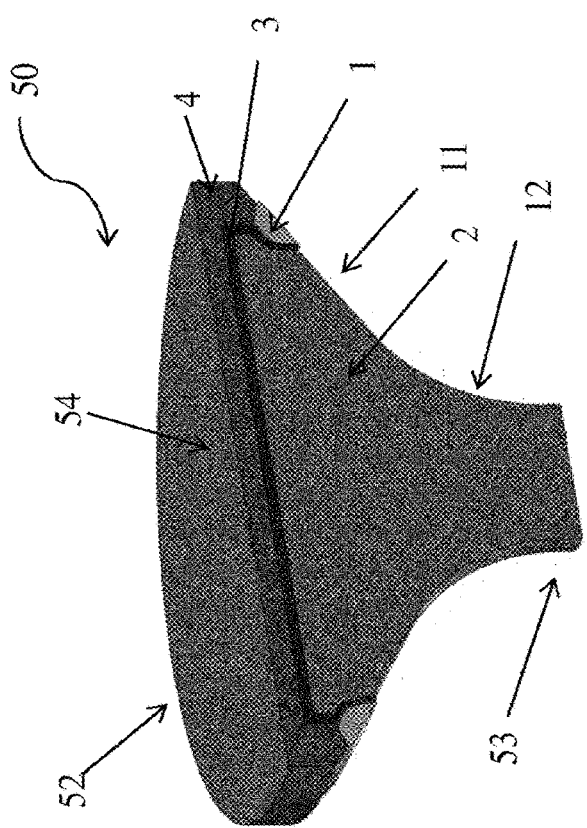
FIG. 4: Shows schematically a component obtained by the present method.

FIG. 4 shows schematically, in cross-section, a perspective view of a valve spindle 50 obtained by the present method. The valve spindle 50 comprises a stem 53 and valve disc 52. The valve disc has a flat upper surface 54, which in the engine faces the cylinder room. The flat surface 54 is also called the exhaust surface. Seen in cross-section, the valve spindle 50 comprises a core body 2 having a core head 11 which is integrated in the valve disc 2 so that the core head 11 forms an inner portion of the valve disc 52. The core body 2 also comprises a stem portion 12 which forms the stem 53 of the valve spindle. The valve spindle 50 further comprises a valve seat 3, a buffer layer 1 and a corrosion resistant cladding 4. The buffer layer 1 is arranged on the core body. In particular the buffer layer 1 is arranged on the core head 11 between the core head 11 and the corrosion resistant cladding 4 and between the valve seat 3 and the core head 11 to prevent diffusion of carbon from the core head 11 to the corrosion resistant cladding 4 or to the valve seat 3. Carbon has a negative effect on the corrosion resistance and the mechanical properties of the cladding and the valve seat 3. The corrosion resistant cladding 4 covers the buffer layer and the valve seat and forms the outer surface of the valve disc 52 of the valve spindle 50.

Figure 1:
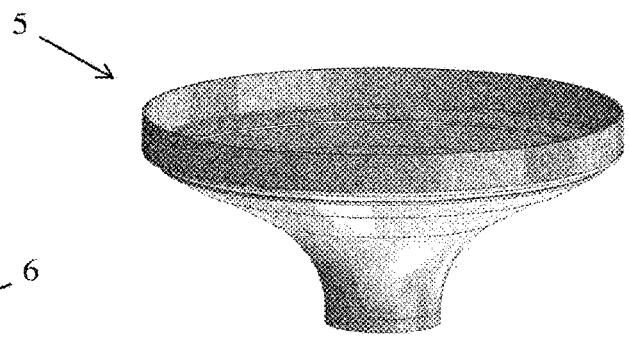
FIG. 1-3: Shows schematically the main steps of the present method.

In a first step 100 of the present method, see FIG. 1, a capsule 5, which defines at least a portion of the outer shape or contour of the valve spindle is provided. The capsule 5 is manufactured from steel sheets that have been shaped into a suitable form by e.g. pressing or spin forming and then welded together. Preferably, the steel sheets are manufactured from steel having a low content of carbon. For example, a low carbon steel having a carbon content of 0-0.09 wt % carbon. Examples of suitable steel for the capsule are the commercially available steels DC04, DC05 or DC06 available from the company SSAB. Such steels are suitable as they provide a minimum of carbon diffusion to the valve spindle. A further advantage of these steel grades is that they may easily be removed by pickling in acid. The capsule 5 is of circular cross-section and consists of a lower cylindrical portion having the form of the stem 53 of the valve spindle 50. The upper portion of the capsule 5 has the form of the valve disc 52 of the valve spindle 1.

Figure 2:
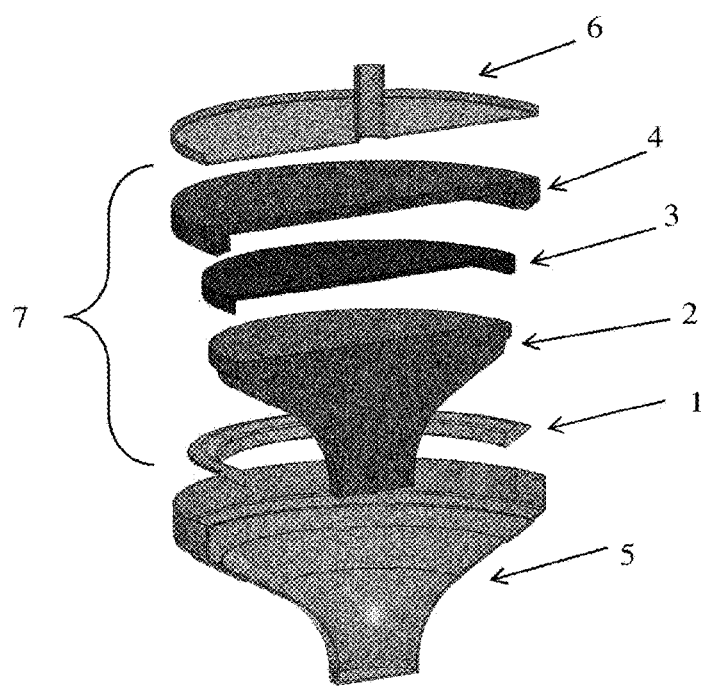

In a second step 200, see FIG. 2, metallic material 7 is arranged in capsule. The metallic material consists of a valve seat 1, a core body 2, a buffer layer 3 and a cladding layer 4.

The valve seat 1 is manufactured from the commercially available alloy Inconel 718. This material has high toughness, high hardness and good resistance to hot corrosion. Other suitable materials includes precipitation hardening alloys, such as nickel base- or cobalt base alloys comprising one or several of the elements molybdenum, chromium, niobium, aluminum or titanium. Another example of a suitable alloy for the valve seat is Ni40Cr3.5NbTi.

The preformed core body 2 may be manufactured from alloyed steel having a carbon content of from 0.15-0-35 wt %. One example of a suitable steel for the preformed core body may be the commercially available SNCrW-steel. The pre-formed core body 2 may also be manufactured by using Additive Manufacturing. The pre-formed core body 2 may also manufactured by forging.

The buffer layer 3 is arranged onto the head 11 of the core body 2. The buffer layer 3 covers the upper side and the edge portion of the core head 11. The buffer layer 3 may consist of low carbon steel, having a carbon content of from 0-0.09 wt % carbon. The buffer layer may further be alloyed with chromium in an amount of from 12-25 wt % for example of from 14-20 wt %. One suitable material for the buffer layer is the commercially available 316L-steel. In principle, the buffer layer absorbs carbon from the core element and binds the carbon in the buffer layer through the formation of chromium rich carbides. The buffer layer should be thick enough to form a continuous layer between the core element and the valve seat. The thickness of the buffer layer further depends on the amount of carbon in the core element and the operational conditions in the engine, for example the thickness of the buffer layer is in the range of from 2-10 mm, such as of from 3-7 mm, such as of from 3 mm or 5 mm.

On top of the buffer layer 3 is a cladding layer 4 arranged. The cladding layer 4 forms the exhaust side and the peripheral portion of the valve disc 52. The cladding layer is manufactured from a highly corrosion resistant alloy, The alloy may be a nickel based alloy comprising Cr, Nb, Al and Mo. Examples of suitable alloys for the cladding layer are the commercially available alloys Ni49Cr1Nb or Inconel 657.

According to the disclosure, at least one of the valve seat 1, the core body 2, the buffer layer 3 and the cladding layer 4 is a pre-manufactured coherent body consisting of metallic powder which has been consolidated such that the metallic powder is held together into a coherent body. That is, the bodies 1, 2, 3, 4 are sufficiently strong to be handled manually, i.e. picked up by hand and placed in the capsule without breaking. Each of the bodies 1, 2, 3, 4 may be a pre-manufactured coherent body consisting of metallic powder. It is also possible that two or three bodies 1, 2, 3, 4 are pre-manufactured coherent bodies consisting of metallic powder and that the remaining body or bodies are provided as loose powder, i.e. powder which is not adhered or bonded. The metallic powder used is as described in the previous sections. Hence, the valve seat 1 may consist of a loose or consolidated powder of Inconel 718. The buffer layer 3 may consist of a powder of 316L-steel, the cladding layer 4 may consist of a loose or consolidated powder of Inconel 657 and the core body may consist of a loose or consolidated powder of SNCrW-steel. However, typically the core body is manufactured by forging a solid piece of steel such as SNCrW-steel.

The at least one portion of the pre-manufactured coherent bodies 1, 2, 3, 4 is manufactured by Additive Manufacturing, such as 3D-printing. According to one embodiment of the present disclosure more than one portion of the pre-manufactured coherent bodies 1, 2, 3, 4 may be manufactured by Additive Manufacturing. According to yet another embodiment, the pre-manufactured coherent bodies 1. 2, 3, 4 are manufactured by Additive Manufacturing.

Generally, in Additive Manufacturing a body may be built up by discrete layers of a mixture of metallic powder and binder that are laid on top of each other. The binder is driven off from the body and the body is sintered into a coherent state. If the Additive Manufacturing is 3D-printing, the 3D-printing may for example be performed in the 3D-printing machine "Exone M-Print" which is commercially available from the company Exone Inc.

If the bodies 1, 2, 3, 4 are to be sintered, they are placed in a sintering furnace which is heated to a temperature below the melting point of the metallic powder. Sintering is performed in atmospheric pressure or vacuum and at low sintering temperatures to avoid that the body is densified. The exact temperature has to be determined for each metallic material in question. During sintering the contact surfaces of the metallic powder particles adhere to each other and after cooling a pre-manufactured coherent body is achieved. Since it is sintered the body is porous, i.e. it has a porosity of 60-80 vol %, for example 65-75 vol %. The degree of porosity in the sintered pre-manufactured body may be influenced by sintering temperature. Further, if the bodies 1, 2, 3, 4 comprise a binder, the binder may be driven off by using the same furnace as used for the sintering or by using a separate debinding equipment.

Figure 5:
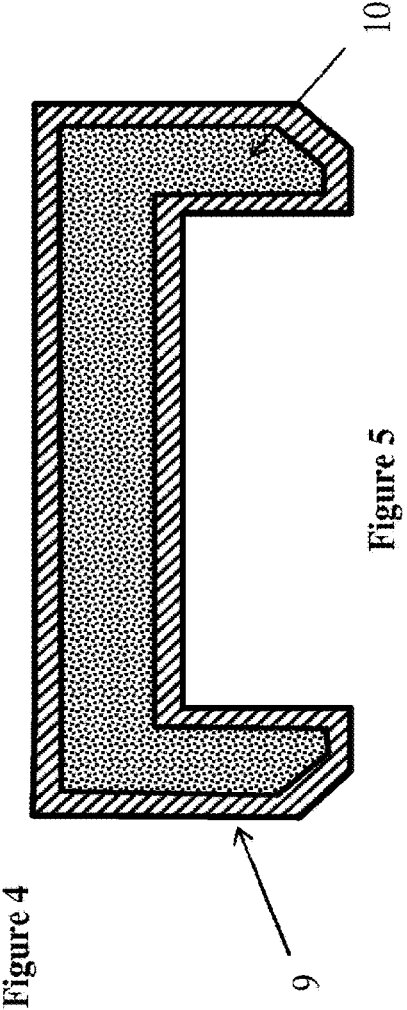
FIG. 5: Shows schematically a pre-manufactured body according to an embodiment.

According to another embodiment, the pre-manufactured coherent bodies are coherent shells which contain metallic powder. FIG. 5 shows schematically a coherent body according to the second embodiment, in this case the cladding layer 4. The entire outer surface of body 4, is consolidated into a coherent shell 9 which encloses a volume of metallic powder 10. The thickness of the shell may for example be 1-3 mm thick depending on the dimensions of the body. The shell 9 forms a container which holds the metallic powder. Depending on the manufacturing method, the metallic powder enclosed by the shell may be loose metallic powder or metallic powder which is sintered.

Pre-manufactured coherent bodies in the form of shells may also be manufactured by 3D-printing, i.e. by placing discrete layers of metallic powder on top of each other. However, in this case only the periphery of the layers is subjected to laser sintering so that only the outer surface of the final body is consolidated. A suitable machine for this purpose is EOS M 400 which is commercially available from EOS GmbH. In this case the shell consists of coherent sintered metallic power and the metallic powder which is enclosed by the shell is loose metallic powder, i.e. it is not sintered.

It is also possible form the shell by consolidating the metallic powder in the periphery of the layers by electron beam (EB) melting followed by cooling. This may be achieved in an Arcam Q20 apparatus which is commercially available from the company Arcam AB. In this case the shell consists of coherent melted and solidified metallic power and the metallic powder in the shell is sintered to a low degree by the heat generated by the electron beam process.

After arranging the pre-manufactured coherent bodies of metallic powder material 1, 2, 3, 4 in the capsule 5, the capsule is closed by arranging a lid 6 on top of the capsule. The lid is welded to the capsule and a vacuum is drawn in the capsule. Finally, the capsule is sealed by welding any openings shut. After welding, the capsule should be gas-tight.

In a third step 300, the filled capsule is subjected to Hot Isostatic Pressing for a predetermined time, at a predetermined pressure and a predetermined temperature so that the metallic material is densified. During HIP, the pre-manufactured coherent bodies 1, 2, 3, 4 and the capsule 5 bond metallurgical to each other whereby a dense, diffusion bonded, coherent HIP:ed metallic component is achieved.

Figure 3:
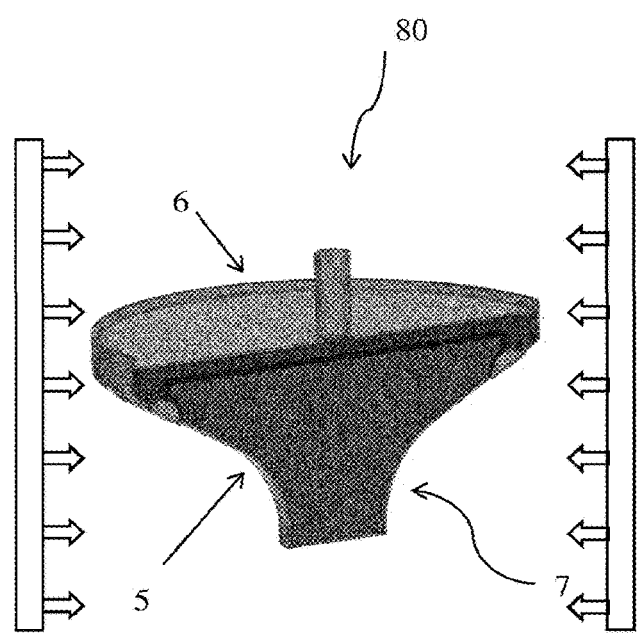

The filled and sealed capsule 5 is thereby placed in a HIP-chamber 80, see FIG. 3. The HIP-chamber is pressurized with gas, e.g. argon gas, to an isostatic pressure in excess of 500 bar. Typically the isostatic pressure is between 900-1200 bar. The chamber is heated to a temperature which is below the melting point of the lowest melting material or phases that may form. The closer to the melting point the temperature is, the higher the risk for the formation of melted material and unwanted phases. Therefore, the temperature should be as low as possible in the furnace during HIP:ing. However, at low temperatures the diffusion process slows down and the material will contain residual porosity and the metallurgical bond between the particles becomes weak. Therefore, the temperature is preferably between 100-300° C. below the melting point of the lowest melting material, for example between 900-1150° C., or 1000-1150° C. The diffusion processes that take place between the materials in the capsule during HIP:ing are time dependent so long times are preferred. Too long times could lead to poor properties of the HIP:ed material due to e.g. grain growth or excessive dissolution of phases. Preferable, HIP process should be earned out for a time period of 0.5-4 hours, depending on the cross-sectional dimensions of the component in question.

In an optional step 500, after HIP and cooling, the capsule 5 and the lid 6 may be removed from the metallic component 50, for example by pickling or machining.

Although particular alternatives and embodiments have been described in detail, this has been done for illustrative purposes only and is not intended to be limiting. In particular it is contemplated that various substitutions, alterations and modifications may be made within the scope of the appended claims.

For example, instead of manufacturing complete pre-manufactured coherent bodies of metallic powder, it is also possible to manufacturing a body, for example the valve seat, in sections and arranging the sections in the capsule. This could be necessary when large components are manufactured since the 3D printing machines put limitations to the maximum size of the bodies.

When a solid, i.e. forged core body 2 is used, the core body could form a part of the capsule. In this case the capsule is welded to the solid core body 2 which for example forms the bottom of the capsule.

What is claimed is:

1. A method for manufacturing a metallic component, comprising the steps of:
    manufacturing a pre-manufactured coherent body by Additive Manufacturing including sequentially superimposing layers of a first metallic powder, wherein the pre-manufactured coherent body includes at least a portion of the first metallic powder consolidated such that the first metallic powder is held together into the pre-manufactured coherent body with a binder;
    sintering the pre-manufactured coherent body in a sintering furnace to form a sintered pre-manufactured coherent body in which contact surfaces of the metallic powder particles adhere to each other, wherein the sintering temperature is below the melting point of the first metallic powder and is sufficient to drive off the binder from the pre-manufactured coherent body;
    arranging the sintered pre-manufactured coherent body and a metallic material in a capsule which defines at least a portion of a shape of the metallic component;
    sealing the capsule to be gas-tight; and
    subjecting the capsule to Hot Isostatic Pressing at an isostatic pressure between 900-1200 bar and at a HIP temperature between 100-300° C. below a lowest melting point of any of the first metallic powder and the metallic material and for a time period of 0.5-4 hours.

2. The method of claim 1, wherein a porosity of the sintered pre-manufactured coherent body matches a porosity of loose metallic powder.

3. The method of claim 1, wherein the metallic material is a loose powder.

4. The method of claim 1, wherein the metallic material is a consolidated powder.

5. The method of claim 1, wherein the metallic material includes another pre-manufactured coherent bodies.

6. The method of claim 1, wherein the metallic material includes at least three pre-manufactured coherent bodies.

7. The method of claim 1, wherein the HIP temperature is between 900-1150° C.

8. The method of claim 1, wherein the entire pre-manufactured coherent body is manufactured by Additive Manufacturing.

9. The method of claim 1, wherein the entire pre-manufactured coherent body is sintered metallic powder.

10. The method of claim 1, wherein Additive Manufacturing is 3D-printing.

11. The method of claim 1, further comprising drawing a vacuum on the capsule prior to sealing the capsule to be gas-tight.

12. The method of claim 1, further comprising, subsequent to subjecting the capsule to Hot Isostatic Pressing, the step of cooling the capsule and removing the capsule.

13. The method of claim 1, wherein the first metallic powder has a composition including alloyed steel having a carbon content of from 0.15-0-35 wt % carbon and the metallic material has a composition including low carbon steel having a carbon content of from 0-0.09 wt % carbon.

14. The method of claim 13, wherein the composition of the metallic material further includes 12-25 wt % chromium.

15. The method of claim 1, wherein the metallic component is a valve spindle, the valve spindle including a valve disc and a valve stem, wherein the capsule defines at least a portion of the valve disc, and the metallic material includes a valve seat and a core body having a core head, a cladding layer and a buffer layer arranged on the core head, and wherein at least one of the valve seat, the buffer layer and the cladding layer are coherent pre-manufactured bodies of metallic powder.

16. The method of claim 15, wherein the core body is a forged body.

17. The method of claim 1, wherein, in the step of sintering, the pre-manufactured coherent body is not densified.

18. A method for manufacturing a metallic component, comprising the steps of:
- manufacturing a pre-manufactured coherent body, wherein at least a portion of the pre-manufactured coherent body is manufactured by (i) Additive Manufacturing including sequentially superimposing layers of a first metallic powder and (ii) consolidating a portion of the first metallic powder to form an outer shell enclosing an interior volume, wherein the interior volume contains a powder including the first metallic powder, a second metallic powder, or a mixture thereof;
- sintering the pre-manufactured coherent body in a sintering furnace to form a sintered pre-manufactured coherent body in which contact surfaces of the metallic powder particles adhere to each other, wherein the sintering temperature is below the melting point of the first metallic powder and is sufficient to drive off the binder from the portion of the pre-manufactured coherent body manufactured by Additive Manufacturing;
- arranging the sintered pre-manufactured coherent body in a capsule which defines at least a portion of a shape of the metallic component;
- sealing the capsule to be gas-tight; and
- subjecting the capsule to Hot Isostatic Pressing at an isostatic pressure between 900-1200 bar and at a HIP temperature between 900-1150° C. and for a time period of 0.5-4 hours.

19. The method of claim 18, wherein consolidating includes sintering.

20. The method of claim 18, wherein consolidating includes melting using a laser beam and cooling.

21. The method of claim 18, wherein consolidating includes melting using an electron beam and cooling.

22. The method of claim 18, wherein the powder enclosed by the shell is loose powder.

23. The method of claim 18, wherein the powder enclosed by the shell is sintered powder.

24. The method of claim 18, wherein the HIP temperature is below a lowest melting point of any of the first metallic powder and the second metallic powder.

25. The method of claim 18, further comprising drawing a vacuum on the capsule prior to sealing the capsule to be gas-tight.

26. The method of claim 18, further comprising, subsequent to subjecting the capsule to Hot Isostatic Pressing, the step of cooling the capsule and removing the capsule.

27. The method of claim 18, wherein Additive Manufacturing is 3D-printing.

28. The method of claim 18, wherein, in the step of sintering, the pre-manufactured coherent body is not densified.

29. The method of claim 18, wherein the metallic component is a valve spindle, the valve spindle including a valve disc and a valve stem, wherein the capsule defines at least a portion of the valve disc, and the metallic material includes a valve seat and a core body having a core head, a cladding layer and a buffer layer arranged on the core head, and wherein at least one of the valve seat, the buffer layer and the cladding layer are coherent pre-manufactured bodies of metallic powder.

30. The method of claim 29, wherein the core body is a forged body.

31. The method of claim 18, wherein a porosity of the outer shell matches a porosity of the powder contained in the interior volume.

32. The method of claim 31, wherein first metallic powder has a composition including alloyed steel having a carbon content of from 0.15-0-35 wt % carbon and the metallic material has a composition including low carbon steel having a carbon content of from 0-0.09 wt % carbon.

33. The method of claim 32, wherein the composition of the metallic material further includes 12-25 wt % chromium.

34. The method of claim 18, further comprising arranging a metallic material in the capsule adjacent to one or more surfaces of the sintered pre-manufactured coherent body.

35. The method of claim 34, wherein the metallic material is another pre-manufactured coherent body that includes an outer shell of consolidated metallic material.

36. The method of claim 34, wherein the metallic material includes at least three pre-manufactured coherent bodies.

37. The method of claim 34, wherein the metallic material is a loose powder.

38. The method of claim 34, wherein the metallic material is a consolidated powder.

39. The method of claim 34, wherein a porosity of the metallic material matches a porosity of the outer shell of the sintered pre-manufactured coherent body.

40. The method of claim 34, wherein the HIP temperature is below a lowest melting point of any of the first metallic powder, the second metallic powder, and the metallic material.

* * * * *